(No Model.)
J. J. FLYNN.
EXTENSION LADDER.
No. 437,395. Patented Sept. 30, 1890.
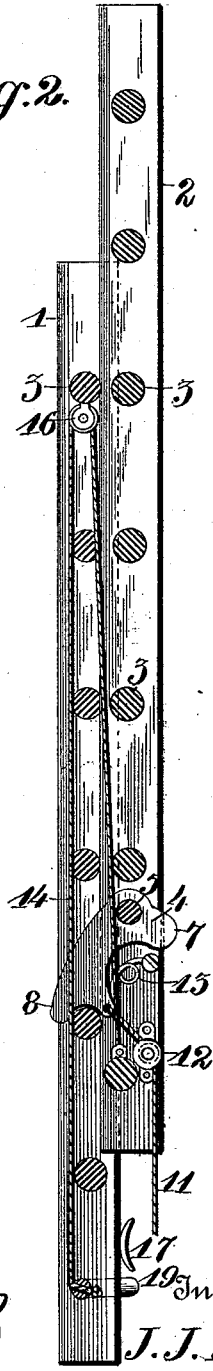
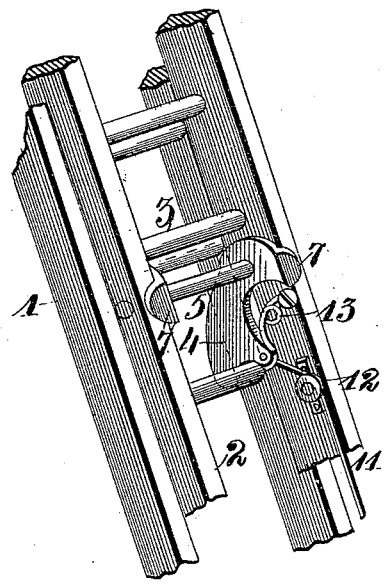
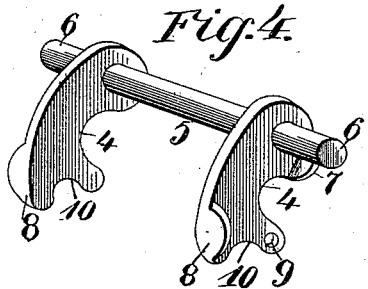
Witnesses
C. F. Hallet
H. C. Johnson
Inventor
J. J. Flynn
By his Attorneys
Higdon & Higdon

UNITED STATES PATENT OFFICE.

JOHN J. FLYNN, OF ST. LOUIS, MISSOURI.

EXTENSION-LADDER.

SPECIFICATION forming part of Letters Patent No. 437,395, dated September 30, 1890.

Application filed July 16, 1890. Serial No. 358,888. (No model.)

*To all whom it may concern:*

Be it known that I, JOHN J. FLYNN, of St. Louis, in the State of Missouri, have invented certain new and useful Improvements in Extension-Ladders, of which the following is a full, clear, and exact description, reference being had to the accompanying drawings, forming a part thereof.

My invention has for its object to provide a novel construction in extension-ladders; and it consists in the combination and arrangement of parts, as will be hereinafter fully described, and pointed out in the claims.

In the drawings, Figure 1 is a front elevation of my complete invention. Fig. 2 is a longitudinal section thereof, taken on the line $x\ x$ of Fig. 1. Fig. 3 is a perspective view of my invention, partly broken away; and Fig. 4 is a perspective view of the dogs and shaft formed therewith detached.

Referring to the drawings, 1 represents the stationary ladder, which is of sufficient width to permit the movable section 2 to move freely between the parallel bars of the same, and 3 are the usual rungs, the ends of which are secured or embedded in any convenient manner within and between the said parallel bars of the two sections.

4 4 represent two dogs cast or formed integral with a horizontal shaft 5, the projecting ends 6 6 of which are journaled within the parallel bars of the movable section 2 of the ladder. The dogs 4 4 are provided with outwardly-turned lips 7 7 in rear of the shaft 5, which lips limit the movement of the dogs by bearing against the edges of the movable section 2 when the said dogs are in an engaging position with the rungs of the stationary section 1.

8 8 are two lips similar to those previously described, and which are also formed integral with the dogs 4 4 and project in the same direction, but located upon the forward face of the said dogs, and which lips bear against the opposite sides of the movable section 2 and prevent the dogs from moving too far when the same are released from the rung.

10 10 represent the engaging ends of the dogs 4 4 for receiving the rungs 3, carried by the stationary section 1 when in a locked position, and which hold the two sections in any desired position or the movable section at any elevation above the stationary one.

9 is a hole formed in the lower portion of one of the dogs 4, and which is located opposite and in rear of the lip 8, within which hole a rope 11 is secured for releasing the dogs 4 4 from their locked position upon the rungs 3 when it is desired to lower the movable section.

A pulley 12 is secured to one side of the movable section 2, over which the rope 11 moves, in order that the dogs may be properly drawn out of a locked position.

13 represents a spring secured to one side of the movable section 2, the free end of which bears against the rear surface of one of the dogs and presses them outward or in contact with the rungs carried by the stationary section 1.

To the lower rung of the movable section 2 is fastened an eye 15, to which is secured a rope 14, leading upward and over a pulley 16, fastened to the upper rung of the stationary section.

A crank-shaft 18 is journaled within the parallel bars of the stationary section at its lower portion thereof, and to which shaft the opposite end of the rope 14 is attached and carried thereby.

19 represents a crank formed integral with the shaft 18, by which means the same is revolved and in its turn raises or lowers the movable section, as may be desired.

Any suitable device—such as 17—is fastened to the lower portion of the stationary section, around which the rope 11 may be wrapped when not in use.

When it is desired to raise the movable section or lengthen the ladder, the crank 19 is turned, which causes the shaft 18 to revolve and in its turn shortens the rope 14 by being wound upon the same. During the movement of lengthening the ladder the dogs 4 4 will slide over the rungs of the stationary section and catch upon the same when the desired height is reached.

When it is desired to lower the movable section, the dogs are released from their engagement upon the rungs by pulling on the rope 11, causing the said section to move freely downward.

I am aware that prior to my invention extension-ladders consisting of two sections, one moving upon the other and having dogs for engaging the rungs have been used; also that raising and lowering devices are old.

In my invention the dogs for engaging the rungs are rigidly secured to a shaft, which is journaled in the movable section, and by this means the devices used for operating the dogs are only used in connection with one of the dogs and from one side of the ladder.

Having fully described my invention, what I claim is—

1. In an extension-ladder, the combination of the stationary section, the movable section adapted to slide within the said section, two dogs provided with a shaft and formed integral therewith, the projecting ends of which shaft are journaled in the said movable section, and outwardly-projecting lips formed with the said dogs for retaining the same in proper position, substantially as described.

2. In an extension-ladder, the combination of the stationary section 1, the movable section 2, adapted to slide within the same, the dogs 4 4, secured to a shaft 5 and journaled within the said movable section, the outwardly-projecting lips 7 7 and 8 8, formed integral with the said dogs, the spring 13, secured to the movable section, and the rope 11, secured to one of the dogs and passing over the pulley 12 for releasing the said dogs, substantially as described.

3. In an extension-ladder, the combination of the stationary section 1, the crank-shaft 18 journaled therein, a pulley 16, secured to the upper rung of the said section, the movable section 2, the shaft 5, journaled within the said section, the dogs 4 4, rigidly secured to the said section, the lips 7 7 and 8 8, formed with the said dogs, the spring 13, fastened to the movable section, the free end of which bears against one of the dogs, the rope 11 for releasing the said dogs, and the rope 14, fastened to the lower rung of the movable section, passing over the pulley 16 and attached to the said crank-shaft, substantially as described.

In testimony whereof I affix my signature in presence of two witnesses.

JOHN J. FLYNN.

Witnesses:
JNO. C. HIGDON,
C. F. KELLER.